United States Patent
Bowers et al.

(10) Patent No.: US 9,361,447 B1
(45) Date of Patent: Jun. 7, 2016

(54) AUTHENTICATION BASED ON USER-SELECTED IMAGE OVERLAY EFFECTS

(71) Applicant: EMC Corporation, Hopkinton, MA (US)

(72) Inventors: Kevin D. Bowers, Melrose, MA (US); Vihang P. Dudhalkar, Mumbai (IN); Ari Juels, Brookline, MA (US); Ronald L. Rivest, Arlington, MA (US); Samir Saklikar, Bangalore (IN); Nikolaos Triandopoulos, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 5 days.

(21) Appl. No.: 14/477,152

(22) Filed: Sep. 4, 2014

(51) Int. Cl.
| | |
|---|---|
| *G06F 21/00* | (2013.01) |
| *G06F 21/31* | (2013.01) |
| *H04L 12/00* | (2006.01) |
| *G06F 21/36* | (2013.01) |
| *G06F 3/0484* | (2013.01) |

(Continued)

(52) U.S. Cl.
CPC ............ *G06F 21/36* (2013.01); *G06F 3/04842* (2013.01); *G06F 21/31* (2013.01); *H04L 9/3226* (2013.01); *H04L 63/08* (2013.01); *H04L 63/083* (2013.01)

(58) Field of Classification Search
CPC ....... G06F 21/36; G06F 21/31; H04L 63/083; H04L 63/08; H04L 9/3226
USPC .................................................... 726/5, 7, 19
See application file for complete search history.

(56) References Cited

U.S. PATENT DOCUMENTS

| | | |
|---|---|---|
| 5,559,961 A | 9/1996 | Blonder |
| 2003/0093699 A1 | 5/2003 | Banning et al. |
| 2007/0277224 A1 | 11/2007 | Osborn et al. |

(Continued)

FOREIGN PATENT DOCUMENTS

| | | |
|---|---|---|
| EP | 2466513 A1 | 12/2010 |
| WO | 0177792 A2 | 10/2001 |

OTHER PUBLICATIONS

R.A. Adcock et al., "Reward-Motivated Learning: Mesolimbic Activation Precedes Memory Formation," Neuron, May 2006, pp. 507-517, vol. 50, No. 3.

(Continued)

*Primary Examiner* — Alexander Lagor
(74) *Attorney, Agent, or Firm* — Ryan, Mason & Lewis, LLP

(57) ABSTRACT

A processing device comprises a processor coupled to a memory and is configured to implement an overlay effects selection interface for use in conjunction with generation of a graphical password. An image is obtained and presented in the overlay effects selection interface with a plurality of user-selectable overlay effects. User input is received identifying at least one overlay effect selected from the plurality of user-selectable overlay effects, and a modified version of the image is presented incorporating the selected at least one overlay effect. Information characterizing the image and the selected at least one overlay effect is utilized to control access to a protected resource. For example, the information characterizing the image and the selected at least one overlay effect may be obtained as part of a graphical password enrollment process and stored as at least a portion of the graphical password for controlling access to the protected resource.

22 Claims, 4 Drawing Sheets

(51) Int. Cl.
  *H04L 9/32* (2006.01)
  *H04L 29/06* (2006.01)

(56) References Cited

U.S. PATENT DOCUMENTS

| | | |
|---|---|---|
| 2008/0263361 A1 | 10/2008 | Dutta et al. |
| 2009/0210939 A1 | 8/2009 | Xu et al. |
| 2010/0031200 A1 | 2/2010 | Chen |
| 2010/0322485 A1 | 12/2010 | Riddiford |
| 2010/0325721 A1 | 12/2010 | Bandyopadhyay et al. |
| 2011/0096997 A1* | 4/2011 | Marciszko .............. G06F 21/36 382/218 |
| 2012/0159592 A1 | 6/2012 | Griffin et al. |
| 2012/0291120 A1 | 11/2012 | Griffin |
| 2012/0304284 A1 | 11/2012 | Johnson et al. |
| 2013/0047252 A1 | 2/2013 | Johnson et al. |
| 2014/0068754 A1 | 3/2014 | Burkill |
| 2014/0189856 A1 | 7/2014 | Yoo |

OTHER PUBLICATIONS

F.F. Barbosa et al., "Effect of the Time-of-Day of Training on Explicit Memory," Brazilian Journal of Medical and Biological Research, Jun. 2008, pp. 477-481, vol. 41, No. 6.

K.A. Carlson, "The Impact of Humor on Memory: Is the Humor Effect About Humor?" Humor-International Journal of Humor Research, http://www.degruyter.com/view/j/humr.2011.24.issue-1/humr.2011.002/humr.2011.002.xml, Jan. 2011, pp. 21-41, vol. 24, No. 1.

S.R. Schmidt, "The Humour Effect: Differential Processing and Privileged Retrieval," Memory, http://www.tandfonline.com/doi/pdf/10.1080/09658210143000263#.U-T3suNdWyU, Mar. 2002, pp. 127-138, vol. 10, No. 2.

\* cited by examiner

AUTHENTICATION BASED ON USER-SELECTED IMAGE OVERLAY EFFECTS

FIELD

The field relates generally to information security, and more particularly to techniques for controlling access to protected resources.

BACKGROUND

In order to gain access to protected resources, users are often required to enter passwords in order to prove their identity. Different applications, accounts or other types of protected resources associated with a given user may each require entry of a distinct password, thereby necessitating that the user remember multiple such passwords in order to access the corresponding resources.

An alphanumeric password is often entered using a keyboard of a computer, mobile telephone or other type of processing device. Due to the large number of keys on a typical keyboard, the number of possible combinations is virtually endless, leading to high theoretical entropy. In practice, however, the effective entropy is much lower as users tend to pick weak alphanumeric passwords, such as common words or phrases. Moreover, due to the burden of remembering multiple alphanumeric passwords, a user will often write down the passwords or otherwise make them vulnerable to inadvertent disclosure.

Although graphical passwords are also known, conventional graphical passwords can also be very difficult to remember, again leading users to make poor password choices that provide inadequate security.

Accordingly, a need exists for authentication techniques that avoid the above-noted problems associated with use of conventional alphanumeric or graphical passwords.

SUMMARY

Illustrative embodiments of the present invention provide authentication based on user-selected image overlay effects. Such image overlay effects are advantageously configured to avoid many of the above-noted problems associated with use of conventional alphanumeric or graphical passwords.

In one embodiment, a processing device comprises a processor coupled to a memory and is configured to implement an overlay effects selection interface for use in conjunction with generation of a graphical password. An image is obtained and presented in the overlay effects selection interface with a plurality of user-selectable overlay effects. User input is received identifying at least one overlay effect selected from the plurality of user-selectable overlay effects, and a modified version of the image is presented incorporating the selected at least one overlay effect. Information characterizing the image and the selected at least one overlay effect is utilized to control access to a protected resource.

For example, the information characterizing the image and the selected at least one overlay effect may be obtained as part of a graphical password enrollment process and stored as at least a portion of a graphical password for controlling access to the protected resource.

In a corresponding graphical password verification process, the information characterizing the image and the selected at least one overlay effect is again obtained and compared to at least a portion of the previously-stored graphical password for controlling access to the protected resource.

Graphical passwords generated from user-selected image overlay effects as disclosed herein can provide high entropy while also being much easier for a user to remember than a conventional alphanumeric or graphical password. For example, the modified version of a given image incorporating one or more user-selected image overlay effects can be humorous, bizarre or otherwise memorable, thereby facilitating user recall of the image as well as the corresponding selected overlay effect(s).

DETAILED DESCRIPTION

Illustrative embodiments of the present invention will be described herein with reference to exemplary information processing systems and associated computers or other types of processing devices. It is to be appreciated, however, that the invention is not restricted to use with the particular illustrative system and device configurations shown. Accordingly, the term "information processing system" as used herein is intended to be broadly construed, so as to encompass, for example, any processing system comprising at least one processing platform, including systems comprising virtual machines and other cloud infrastructure.

Figure 1:
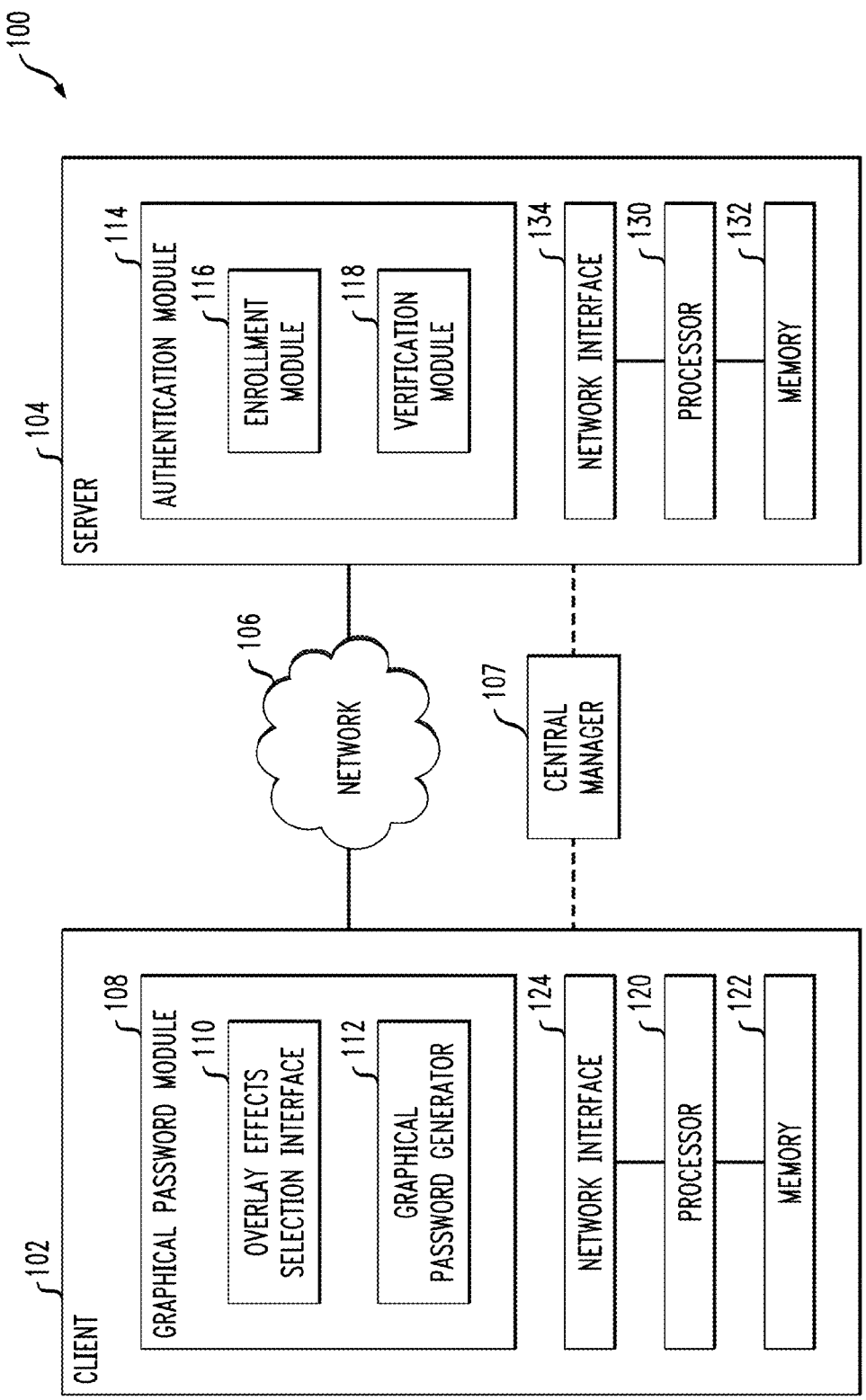
FIG. 1 shows an information processing system configured to provide authentication based on user-selected image overlay effects in an illustrative embodiment of the invention.

FIG. 1 shows an information processing system 100 configured in accordance with an illustrative embodiment of the invention. The system 100 comprises a first processing device 102 and a second processing device 104 that communicate with one another over a network 106. Also coupled to the network 106 is a central manager 107. The central manager 107 illustratively also communicates with the devices 102 and 104, possibly via one or more additional communication channels not necessarily implemented over the network 106, as shown by the dashed lines in the figure.

The central manager 107 in the present embodiment is illustratively configured to incorporate functionality for facilitating at least one of enrollment or verification of a graphical password generated based on user-selected image overlay effects.

In other embodiments, the central manager 107 can be eliminated, and graphical password enrollment and verification can be carried out using just the first and second processing devices 102 and 104.

Also, still further embodiments can implement graphical password enrollment and verification on a single processing device, such as the processing device 102, without involvement of any other processing device. For example, authentication based on user-selected image overlay effects can be implemented on a computer or mobile telephone to control access to that processing device or to a particular application running on that processing device. Numerous alternative arrangements of one or more processing devices are possible.

The first and second processing devices 102 and 104 in the FIG. 1 embodiment are more particularly designated as a client and a server, respectively, with the client being configured to generate a graphical password that is stored by the server in conjunction with an enrollment process. The stored graphical password is utilized by the server in a subsequent verification process in conjunction with an attempt by a user associated with the client to access a protected resource controlled by the server. The client and server will also be referred to herein using the respective reference numerals 102 and 104. Again, numerous alternative authentication arrangements can be used, including ones in which both enrollment and verification of a given graphical password are performed by the client.

Although the first and second processing devices 102 and 104 are configured in the present embodiment as respective client and server devices, this is by way of example only. In other embodiments, a single device can operate as a client relative to one device and as a server relative to another device. Thus, it is possible for a single device to include both client and server functionality.

The client 102 in the present embodiment more particularly comprises a graphical password module 108 that provides an overlay effects selection interface 110 and a graphical password generator 112.

The server 104 in the present embodiment more particularly comprises an authentication module 114 that includes an enrollment module 116 and a verification module 118. The server 104 and its authentication module 114 are examples of what are also referred to herein as "authentication entities." Such authentication entities are configured to perform authentication based on user-selected image overlay effects. Again, in other embodiments, the client 102 can itself comprise one or more authentication entities, and the server 104, network 106 and central manager 107 can be eliminated.

The network 106 may comprise, for example, a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

In one possible operating scenario, client 102 is implemented as a laptop computer, a tablet computer, a mobile telephone or another type of mobile communication device that accesses the server 104 over the Internet. Numerous other operating scenarios involving a wide variety of different types and arrangements of one or more processing devices are possible, as will be appreciated by those skilled in the art.

During provisioning of a graphical password in the system 100, a user is presented with one or more images and associated user-selectable overlay effects via the overlay effects selection interface 110 of the client 102. The overlay selections made by the user are processed by the graphical password generator 112 and the resulting graphical password is enrolled with the authentication module 114 of server 104 via enrollment module 116. These overlay selections can make the resulting modified version of the original image humorous or bizarre so as to increase its memorability to the user while at the same time being hard for others to guess. The presentation of a given image and selection of overlay effects for that image can be repeated for one or more additional images until an appropriate level of password security is reached.

After the graphical password is provisioned in the system 100, the user accesses a corresponding protected resource by recreating the modified version of each image. This requires the user to select the same overlay effects in the overlay effects selection interface 110 that were previously selected in conjunction with generation of the provisioned graphical password. The resulting information is provided to the verification module 118 and compared with stored information characterizing the provisioned graphical password. Access to the protected resource is then controlled responsive to an outcome of the comparison.

In some embodiments, the client 102 illustratively comprises a web browser, and the overlay effects selection interface 110 is implemented at least in part utilizing the web browser. For example, in an alternative embodiment of this type, the web browser running on client 102 collects user selection information via the overlay effects selection interface 110 and provides that information to the server 104. The graphical password generation and verification based on collected user selection information in provisioning and verification processes can then be performed entirely by the server 104. Other separations of functionality between the client 102 and server 104 are possible in other embodiments.

An exemplary process utilizing user-selected image overlay effects in the system 100 will now be described in more detail with reference to the flow diagram of FIG. 2. It is to be understood that this particular process is exemplary only, and additional or alternative processes can be carried out in other embodiments.

In this embodiment, the exemplary process includes steps 200 through 210, which are assumed to be performed by the client 102 in conjunction with generating a graphical password suitable for enrollment with the server 104. The graphical password is generated for a given user to control access by that user to a protected resource.

The term "user" in the context of the present embodiment is assumed to refer to a human user associated with the client 102, although other types of users may be present in other embodiments.

In step 200, an image is obtained for use in the overlay effects selection interface 110 of the graphical password module 108 of client 102. For example, the image can be obtained by retrieving the image from memory 122, possibly in response to user selection of one of a plurality of images accessible to the client 102. Numerous other techniques can be used for obtaining an image in step 200, such as receiving an image from a camera or other image source implemented internally or externally to the client 102.

The obtained image can comprise, for example, an image of a person, an image of a scene, an image of an object, or any of a wide variety of other types of images suitable for modification in accordance with user-selected overlay effects. Exemplary obtained images of a person and a scene can be seen in FIGS. 3 and 4, respectively.

In step 202, the image obtained in step 200 is presented in overlay effects selection interface 110 with a plurality of user-selectable overlay effects. The overlay effects selection interface 110 illustratively comprises a display screen suitable for presenting the image and the user-selectable overlay effects in a manner perceptible to the user. Examples of such display screens will be described in more detail below in conjunction with FIGS. 3 and 4. The overlay effects selection interface 110 further comprises selection circuitry that permits user selection of one or more overlay effects from those presented with the image on the display screen, such as selection circuitry associated with a touch-sensitive display screen, or selection circuitry associated with a wide variety of other user input mechanisms, such as one or more of a keyboard, a mouse, tactile processing circuitry, voice recognition circuitry, gesture recognition circuitry, stylus tracking circuitry, and soft-key processing circuitry, as well as various combinations thereof. Accordingly, user selection of particular overlay effects can be based at least in part on keyboard input, mouse input, touch input, voice input, gesture input, stylus input, soft-key input or other types of input, in any combination.

In step 204, user input is received identifying at least one overlay effect selected from the plurality of user-selectable overlay effects. The user-selectable overlay effects presented with the obtained image in the display screen of the overlay effects selection interface 110 are illustratively arranged in two or more rows each comprising two or more of the overlay effects, as in the examples of FIGS. 3 and 4 which each include two rows of four user-selectable overlay effects presented below an obtained image.

Of course, numerous other arrangements are possible for presenting user-selectable overlay effects with an image, including grid arrangements that include only a single row of overlay effects, as well as a wide variety of non-grid arrangements. One example of an arrangement of the latter type is one in which a user selects a particular section or other portion of a displayed image and multiple user-selectable overlay effects available for that portion are then presented. These and many other possible arrangements are all considered examples of ways in which an image can be presented in an overlay effects selection interface with a plurality of user-selectable overlay effects.

It is possible in some embodiments for a user to designate the particular overlay effects to be presented with the obtained image in the display screen of the overlay effects selection interface. Thus, for example, in a set-up phase of operation of the graphical password module 108, the user can specify particular overlay effects that the user would like to select from in generating graphical passwords using the module 108. These particular overlay effects are selected from a larger set of available overlay effects that are associated with the module 108. In this manner, the user can customize his or her graphical password generation in a manner that facilitates recall of the resulting passwords.

In conjunction with user selection of a particular presented overlay effect, additional user input may be received specifying a desired placement location of a given selected overlay effect when applied to the obtained image, or specifying a modification of at least one of a size, an orientation and a color of a given selected overlay effect when applied to the obtained image. Such information can be incorporated with the obtained image and the one or more overlay effects into a graphical password, as will be described below.

For example, the overlay effects selection interface 110 can be configured to allow a user to zoom in, zoom out, rotate or otherwise alter a given selected overlay effect prior to in conjunction with its application to the obtained image. Similar functionality can be provided to allow user alteration of the obtained image.

In step 206, a modified version of the image incorporating the selected at least one overlay effect is presented to the user via the above-noted display screen of the overlay effects selection interface 110. For example, the obtained image in some embodiments comprises a base image and the user-selectable overlay effects correspond to respective overlay images. In such an arrangement, the overlay images corresponding to respective selected ones of the overlay effects are overlaid on the base image in generating the modified version of the image. The modified version of the image can be a different image generated using the base image and the overlay images, or can be another type of combination of the base image and the overlay images. Numerous other techniques can be used to generate a modified version of the image incorporating the selected at least one overlay effect. For example, a variety of techniques known in the art of image processing can be used to apply one or more selected overlay effects to a base image or other obtained image.

Figure 2:
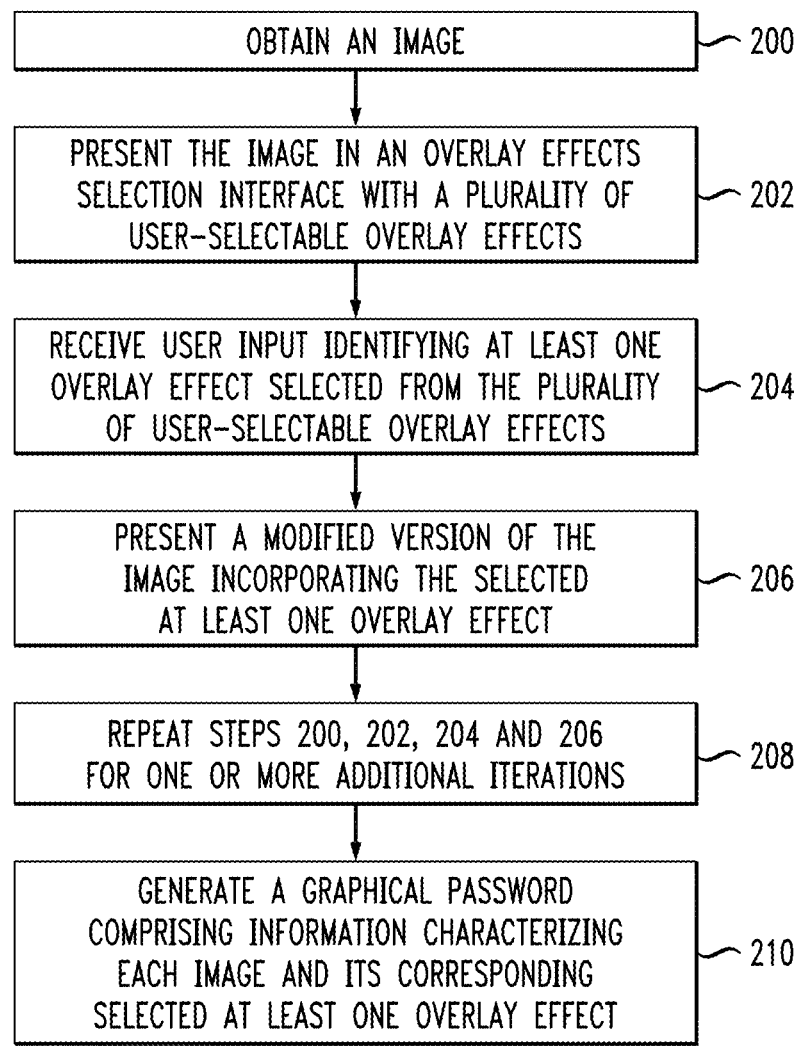
FIG. 2 is a flow diagram of an exemplary process utilizing user-selected image overlay effects in the system of FIG. 1.

The modified version of the image generated in step 206 of the FIG. 2 process is advantageously configured to facilitate subsequent user recall of the image and the selected at least one overlay effect. For example, the modified version of the image can be humorous, bizarre or otherwise memorable, thereby facilitating user recall of the image as well as the corresponding selected overlay effect(s).

The modified image in some embodiments is presented only for a limited time, so as to reduce the chance of an attacker observing the modified image in an over-the-shoulder attack. For example, the selected overlay effects may be configured to fade out or disappear after presentation in the modified image for a designated period of time sufficient to allow the user to memorize the modified image. After the designated period of time, the modified image may be replaced with the original obtained image.

In step 208, the operations of steps 200, 202, 204 and 206 are repeated for one or more additional iterations. For the initial iteration and each additional iteration, information characterizing the image and the selected at least one overlay effect is determined. This information is used in generating a graphical password, as will be described in conjunction with step 210 below. By way of example, two or more iterations can be performed, each starting with a different obtained image.

The process is illustratively configured so as to require a particular number of iterations and associated number of selected overlay effects that are sufficient to satisfy a specified minimum entropy measure. For example, within a given iteration, the user can be required to select additional overlay effects until either the specified minimum entropy measure is satisfied or a specified maximum number of selected overlay effects per image is reached. In the latter case, where the specified maximum number of selected overlay effects per image is reached without satisfying the specified minimum entropy measure, an additional iteration is initiated. The additional iteration can use the same obtained image or a different obtained image. Also, the user-selectable overlay effects presented with the obtained image can be varied from iteration to iteration.

It should be noted that multiple iterations are not a requirement. Accordingly, alternative processes can eliminate the repetition step 208.

In step 210, a graphical password is generated comprising information characterizing each obtained image and its corresponding selected at least one overlay effect. As noted above, this graphical password is utilized to control access to the protected resource.

The information characterizing the image and the selected at least one overlay effect illustratively comprises the modified version of the image itself, or respective identifiers of the image and the selected at least one overlay effect. The information characterizing the image and the selected at least one overlay effect can include additional or alternative information, such as an order in which multiple ones of the overlay effects are selected based on said user input. In addition, the information characterizing the image and the selected at least one overlay effect can include other user-selected overlay effect characteristics, such as the above-noted placement location of a given selected overlay effect, or modification of at least one of a size, an orientation and a color of a given selected overlay effect.

The steps of FIG. 2 are illustratively performed as part of a graphical password enrollment process in which the information characterizing the image and the selected at least one overlay effect is stored as at least a portion of a graphical password for controlling access to the protected resource. Thus, for example, a user associated with the client 102 utilizes overlay effects selection interface 110 and graphical password generator 112 to generate a graphical password that is stored under the control of enrollment module 116 of server 104 for use in accessing a protected resource controlled by the server 104.

Similar operations are performed as part of a graphical password verification process utilizing the verification module 118 of the server 104. As part of this verification process, the information characterizing the image and the selected at least one overlay as recreated from subsequent user input is compared to at least a portion of a previously-stored graphical password for controlling access to the protected resource.

Although the FIG. 2 process as illustrated in the figure assumes interaction of client 102 with a single server 104, separate instances of this exemplary process, possibly performed at least in part in parallel with one another, can be used to generate graphical passwords for respective multiple servers in other embodiments. Similarly, separate instances of the process can be used to generate graphical passwords for respective applications or other protected resources associated with the client 102.

The particular processing operations and other system functionality described in conjunction with the flow diagram of FIG. 2 are presented by way of illustrative example only, and should not be construed as limiting the scope of the invention in any way. Alternative embodiments can use other types of processing operations utilizing user-selected image overlay effects. For example, the ordering of the process steps may be varied in other embodiments, or certain steps may be performed concurrently with one another rather than serially. Also, the process steps may be repeated periodically in conjunction with respective distinct graphical password generation instances.

The client 102 and server 104 in the FIG. 1 embodiment are implemented as respective processing devices. Each such processing device generally comprises at least one processor and an associated memory, and implements one or more functional modules for controlling certain features of the system 100.

Referring again to FIG. 1, the client 102 comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture comprises, for example, a storage device such as a storage disk, a storage array or an integrated circuit containing memory. The term "article of manufacture" as used herein should be understood to exclude transitory, propagating signals.

The network interface 124 allows the client 102 to communicate over the network 106 with the server 104, and comprises one or more conventional transceivers.

At least portions of the graphical password module 108 of the client 102, such as portions of one or both of overlay effects selection interface 110 and graphical password generator 112, may be implemented at least in part in the form of software that is stored in memory 122 and executed by processor 120.

Like the client 102, the server 104 comprises a processor 130 coupled to a memory 132 and a network interface 134.

The processor 130, like processor 120 in client 102, may similarly comprise a microprocessor, a microcontroller, an ASIC, an FPGA or other type of processing circuitry, as well as portions or combinations of such circuitry elements.

The memory 132, like memory 122 in client 102, may similarly comprise RAM, ROM or other types of memory, in any combination.

The network interface 134 allows the server 104 to communicate over the network 106 with the client 102 and comprises one or more conventional transceivers.

At least portions of the authentication module 114 of the server 104, such as portions of one or both of enrollment module 116 and verification module 118, may be implemented at least in part in the form of software that is stored in memory 132 and executed by processor 130.

The above-noted network interfaces 124 and 134 may also be used to support various types of communication utilizing additional or alternative channels for communication of authentication information between system entities.

For example, a separate secure channel not involving communication over network 106 may be utilized by the central manager 107 to provide keys or other authentication information to the client 102 and server 104 in some embodiments. As noted above, in other embodiments the central manager 107 can be eliminated.

It is to be understood that the particular set of elements shown in FIG. 1 for providing authentication based on user-selected image overlay effects is presented by way of illustrative example only, and in other embodiments additional or alternative elements may be used. Thus, another embodiment may include additional or alternative devices and other system entities, as well as different arrangements of device modules and other components.

As mentioned previously, various elements of system 100, such as modules 108, 110 and 112 of client 102 and modules 114, 116 and 118 of server 104, may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices.

Such processing platforms may include cloud infrastructure comprising virtual machines (VMs) and one or more associated hypervisors. An example of a commercially available hypervisor platform that may be used to implement portions of the system 100 is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products and other processing platform components may be utilized to implement at least a portion of the system 100.

Additional details relating to illustrative embodiments of the invention will now be described with reference to FIGS. 3 and 4. As indicated previously, these figures illustrate respective display screens of the overlay effects selection interface 110 for respective obtained images of a person and a scene.

Figure 3:
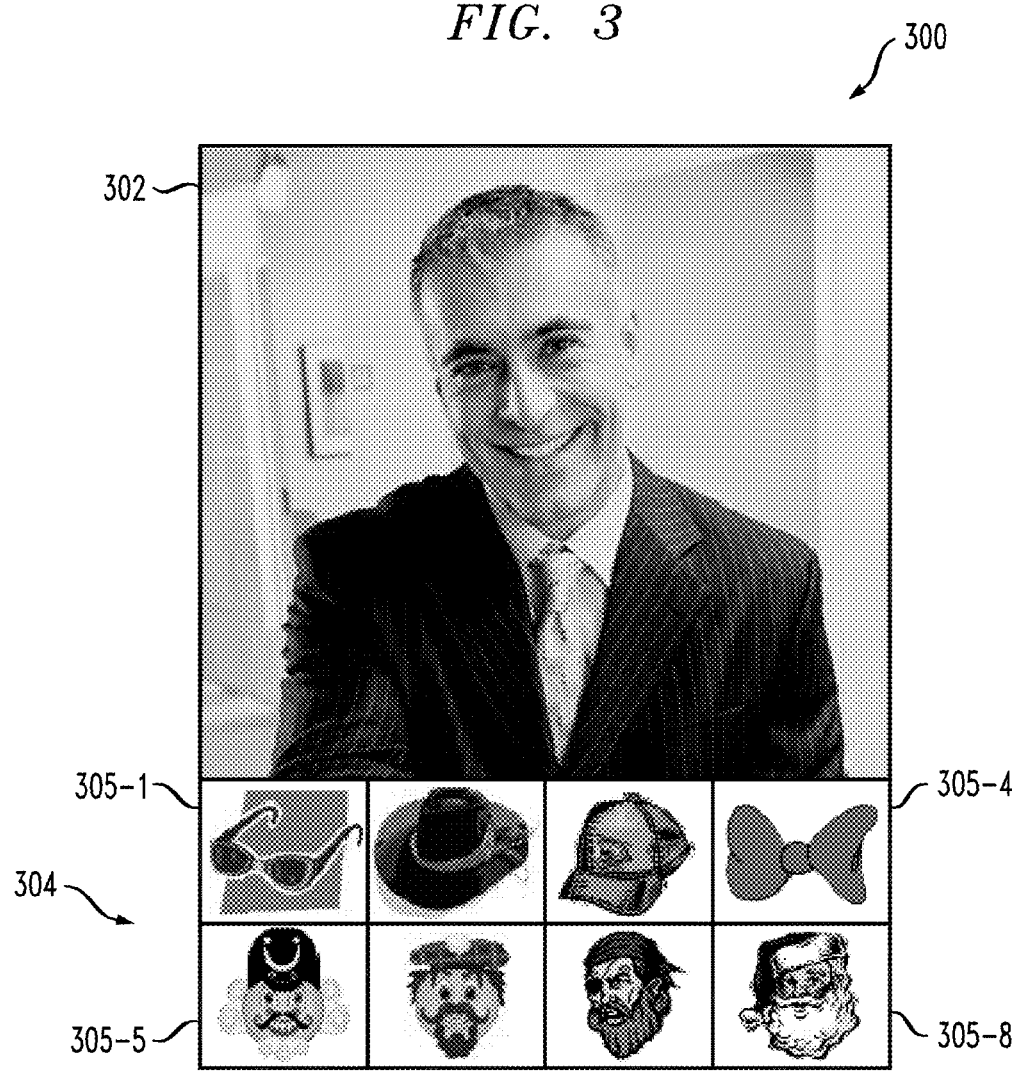
FIGS. 3 and 4 show exemplary displays presented in an overlay effects selection interface for respective person and scene images in illustrative embodiments.

With reference initially to FIG. 3, a display screen 300 of the overlay effects selection interface 110 of the client 102 comprises an upper portion 302 presenting an obtained image of a person, and a lower portion 304 presenting a plurality of user-selectable overlay effects 305. The user-selectable overlay effects in this example comprise a total of eight overlay effects arranged in two rows, with the first row including overlay effects 305-1 through 305-4 and the second row comprising overlay effects 305-5 through 305-8. The overlay effects illustratively include a pair of sunglasses, a cowboy hat, a baseball cap, a bow and a number of different composite effects each including different hats, beards and other facial characteristics. As mentioned above, a user can be permitted to designate the particular overlay effects that will be presented for possible selection with an obtained image.

It is apparent that a modified version of the person image incorporating one or more selected overlay effects in this example will be humorous, bizarre or otherwise memorable, thereby facilitating user recall of the image as well as the corresponding selected overlay effect(s). For example, user selection of overlay effects 305-1 and 305-8 will result in modification of the person image presented in upper portion 302 to include a pair of sunglasses as well as a Santa Claus beard and hat. Unlike a conventional alphanumeric or graphical password, such a modified version of the original image can be highly memorable, and therefore relatively easy for the user to recreate upon a subsequent access attempt.

Figure 4:
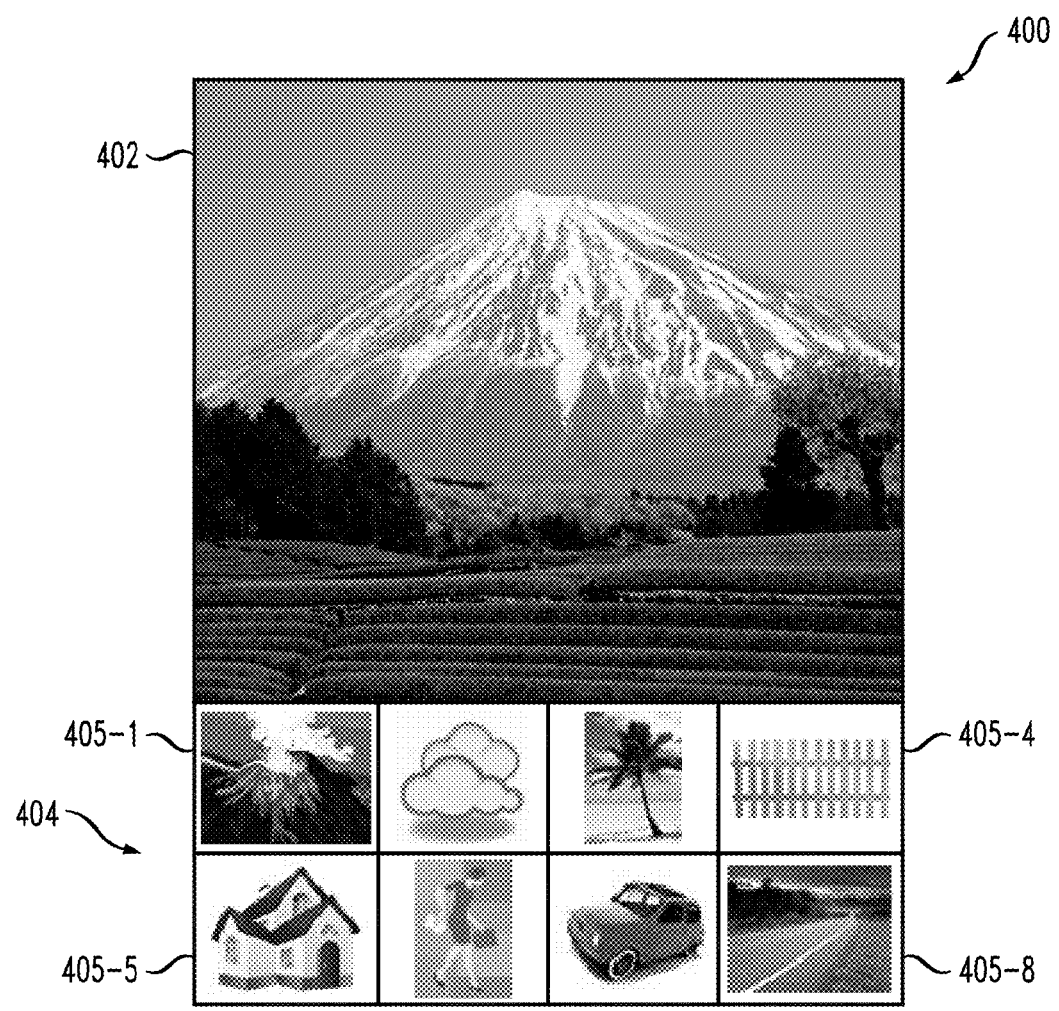

FIG. 4 shows an arrangement similar to that of FIG. 3 but for an image of a scene rather than an image of a person. In this example, a display screen 400 of the overlay effects selection interface 110 of the client 102 comprises an upper portion 402 presenting an obtained image of a scene, and a lower portion 404 presenting a plurality of user-selectable overlay effects 405. The user-selectable overlay effects in this example again comprise a total of eight overlay effects arranged in two rows, with the first row including overlay effects 405-1 through 405-4 and the second row comprising overlay effects 405-5 through 405-8. The scene image in this example is a scene of a mountain, and the overlay effects illustratively include lava, clouds, a palm tree, a fence, a house, a person, a car and a road. As in the previous example, a user can be permitted to designate the particular overlay effects that will be presented for possible selection with an obtained image.

It should be noted that the user-selectable overlay effects presented in the display screen of the overlay effects selection interface 110 may comprise respective icons or other indicators of the corresponding overlay effects to be applied upon selection. Such indicators may be in the form of thumbnail images that are representative of the respective overlay effects. Other formats may be used for these overlay effect indicators and the actual applied overlay effects may differ in some respects from the indicators. In other words, the overlay effects indicators in some embodiments provide only a general representation of the actual overlay effects to be applied to the image upon selection by a user.

The particular obtained images and associated user-selectable overlay effects shown in FIGS. 3 and 4 are presented by way of illustrative example only, and should not be construed as limiting in any way. Numerous alternative presentations of an obtained image and its associated overlay effects can be used.

By way of example, in other embodiments involving images of one or more people, items of clothing, accessories, jewelry, tattoos, skin imperfections, facial hair, and facial characteristics such as various types of eyes, ears, mouth and nose can all be user-selectable overlay effects. Depending on the type of image it may also be possible to have one or more overlay effects that modify a background portion of the image.

In the case of scene images, overlay effects include adding clouds, trees, people or structures, or modifying elements of the scene. For example, a mountain could become covered in snow, overlayed with a lava eruption, or could be replaced with a blue sky to effectively remove it from the image.

Many of the image modifications described above can be utilized for other image types. For example, people commonly anthropomorphize objects (e.g., the front of a car looks like a face), so many of the modifications applicable to people will also apply to general objects (e.g., putting a Santa beard on the Empire State Building).

The images and the possible overlay effects can be automatically generated by the graphical password module 108 of client 102 for presentation to the user, or may be generated as part of a process that involves user determination of the image and possibly also at least a portion of the corresponding user-selectable overlay effects. For example, users can be permitted to select via the interface 110 one or more images to be used as respective base images and can then be presented with a set of all possible available overlay effects. The user could then select which of the overlay effects from the full set are to be made available for user selection in conjunction with provisioning of a given graphical password. The set of overlay effects can be different for each image. Such an arrangement allows the user to classify an image and determine appropriate overlay effects for that image type.

Both the order in which images are presented to the user and the order in which user-selectable overlay effects are displayed on the screen can be modified between authentication attempts. For example, user-selectable overlay effects can be presented in random order for each authentication attempt. While this may add some burden to the user, such features help to prevent an attacker from repeating a user's actions in order to recreate a modified image, for example, from fingerprints left behind on a touchscreen.

Additionally or alternatively, some number of random overlay effects may be automatically applied to the image, requiring the user to remove the incorrect overlay effects and retain the correct ones while also applying any additional overlay effects as needed to recreate the proper modified version of the image. While the resulting image is the same, the actions the user needs to take to achieve that image differs with each authentication, thus changing the actions taken by the user, reducing the ability of an attacker to mimic the user's actions in order to achieve authentication.

In the arrangements of FIGS. 3 and 4, entropy is derived from the selected overlay effects and possibly other factors such as order of selection, placement location, size, orientation, color, etc. For example, user selection of one overlay effect out of the eight presented overlay effects in FIG. 3 or 4 provides three bits of entropy. Repeating this selection of a single one of eight available overlay effects for each of three additional images will provide a total of 3×4=12 bits of entropy. Increasing the number of overlay effects selected for each of the four images to two will provide a total of 6×4=24 bits of entropy.

In the case of selection of multiple overlay effects per obtained image, additional entropy can be provided by the order of selection, although this would of course require the user to also remember the order of selection.

Also, it should be noted that selection of multiple overlay effects can be implemented with or without replacement, respectively allowing or preventing the same overlay effect from being selected more than once for application to a given obtained image.

As noted above, user selection of a particular one of a number of different available placement locations for an overlay effect can be used to provide additional entropy. Depending on the image and the overlay, there may exist a natural location for the overlay effect to be positioned. Sunglasses, for example, would naturally be placed over the eyes in an image of a person. User-selected deviation of placement location from the natural location provides additional entropy, but as with the selection ordering increases the amount of information that the user must recall in order to recreate the modified image in conjunction with a given access attempt. In addition, some implementations of this user-selectable placement location feature can introduce additional complexities associated with fuzzy matching, as the user may not select precisely the same location each time he or she positions the overlay effect. Such complexities can be reduced by providing only a limited number of possible placement locations suitably spaced apart.

In providing an ability for user selection of a placement location for an overlay effect, the overlay effects selection interface 110 can be configured to allow the user to drag an overlay effect to a desired spot on the image. At least some selected overlay effects can be automatically positioned at their natural locations, or in the middle of the image if no natural location exists. From there the user could move the overlay effect to a different location. This feature also allows for the possibility of overlapping overlay effects where overlay effects are essentially stacked on top of each other. In such an arrangement, the order in which the selected overlay effects are applied, for example, from the bottom of the stack up, can be important. Overlapping overlay effects can be accommodated in some embodiments by making one or more of the overlay effects at least partially transparent.

It was also mentioned previously that the overlay effects themselves can potentially be modified when they are applied to the obtained image, for example, by changing the size, orientation, or color of an overlay effect. Each of these modifications provides additional entropy and therefore higher security, but again, can introduce the need for complex fuzzy matching to ensure the same modified image is accurately recreated in conjunction with an access attempt. The overlay effect itself may blur the line of a modification. For example, a "spray can" widget that allows the user to draw graffiti on an overlay effect can be provided in the display screen of an overlay effects selection interface.

The fuzzy matching referred to above can be facilitated through the use of a behavioral analysis of user actions in creating the modified image that includes the selected overlay effects. Such an analysis can be used in conjunction with authentication in order to facilitate verification of a recreated modified image.

As described above, each selection of an overlay effect adds a known number of bits of entropy to a graphical password and the additional entropy provided by placement and modifications of overlay effects can similarly be calculated on the fly. As a result, the system 100 has the advantage of being able to measure entropy as a graphical password is being provisioned. A policy can be implemented in the system in order to specify the minimum amount of entropy allowed for a graphical password, and during provisioning the user can be presented one or more additional images or selectable placement or modification options until the needed entropy measures are met. The user should also be allowed to create additional entropy, beyond that required by the policy, if desired.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing platforms, and processing device configurations. Also, different arrangements of images, user-selectable overlay effects, selection interfaces and enrollment and verification processes may be used. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
    obtaining an image;
    presenting the image in an overlay effects selection interface with a plurality of user-selectable overlay effects;
    receiving user input identifying at least one overlay effect selected from the plurality of user-selectable overlay effects; and
    presenting a modified version of the image incorporating the selected at least one overlay effect;
    wherein information characterizing the image and the selected at least one overlay effect is utilized to control access to a protected resource;
    wherein additional user input is received specifying a modification of at least one of a size, an orientation and a color of a given selected overlay effect with the specified modification being part of the information utilized to control access to the protected resource;
    wherein user selection of a number of overlay effects and one or more associated modifications of respective ones of the selected overlay effects is required to be sufficient to satisfy a specified minimum entropy measure; and
    wherein said obtaining an image, presenting the image, receiving user input and presenting the modified version of the image are performed by at least one processing device comprising a processor coupled to a memory.

2. The method of claim 1 wherein the obtained image comprises a base image and the user-selectable overlay effects correspond to respective overlay images.

3. The method of claim 2 wherein the overlay images corresponding to respective selected ones of the overlay effects are overlaid on the base image in generating the modified version of the image.

4. The method of claim 1 wherein said obtaining an image, presenting the image, receiving user input and presenting the modified version of the image are performed as part of a graphical password enrollment process in which the information characterizing the image and the selected at least one overlay effect is stored as at least a portion of a graphical password for controlling access to the protected resource.

5. The method of claim 4 wherein the modified version of the image generated in the graphical password enrollment process is configured to facilitate subsequent user recall of the image and the selected at least one overlay effect.

6. The method of claim 1 wherein said obtaining an image, presenting the image, receiving user input and presenting the modified version of the image are performed as part of a graphical password verification process in which the information characterizing the image and the selected at least one overlay effect is compared to at least a portion of a previously-stored graphical password for controlling access to the protected resource.

7. The method of claim 1 wherein the information characterizing the image and the selected at least one overlay effect comprises the modified version of the image.

8. The method of claim 1 wherein the information characterizing the image and the selected at least one overlay effect comprises respective identifiers of the image and the selected at least one overlay effect.

9. The method of claim 1 wherein the information characterizing the image and the selected at least one overlay effect comprises an order in which multiple ones of the overlay effects are selected based on said user input.

10. The method of claim 1 wherein said obtaining an image, presenting the image, receiving user input and presenting the modified version of the image are repeated for one or more additional iterations as part of a graphical password enrollment process and wherein information characterizing the image and the selected at least one overlay effect for each of said iterations is stored as part of a graphical password for controlling access to the protected resource.

11. The method of claim 10 wherein each of the iterations starts with a different obtained image.

12. The method of claim 10 wherein corresponding multiple iterations of said obtaining an image, presenting the image, receiving user input and presenting the modified version of the image are performed as part of a graphical password verification process in which the information characterizing the image and the selected at least one overlay effect for each of the iterations is compared to corresponding portions of a previously-stored graphical password for controlling access to the protected resource.

13. The method of claim 1 wherein the obtained image comprises one of an image of a person, an image of a scene and an image of an object.

14. The method of claim 1 wherein the plurality of user-selectable overlay effects presented with the obtained image in the overlay effects selection interface are arranged in two or more rows each comprising two or more of the overlay effects.

15. The method of claim 1 further comprising receiving additional user input specifying a placement location of a given selected overlay effect wherein the specified placement location is part of the information utilized to control access to the protected resource.

16. The method of claim 1 further comprising permitting user designation of particular overlay effects to be presented with the obtained image in the overlay effects selection interface.

17. A non-transitory processor-readable storage medium having stored therein program code of one or more software programs, wherein the program code when executed by at least one processing device causes said at least one processing device:

to obtain an image;
to present the image in an overlay effects selection interface with a plurality of user-selectable overlay effects;
to receive user input identifying at least one overlay effect selected from the plurality of user-selectable overlay effects; and
to present a modified version of the image incorporating the selected at least one overlay effect;

wherein information characterizing the image and the selected at least one overlay effect is utilized to control access to a protected resource;
wherein additional user input is received specifying a modification of at least one of a size, an orientation and a color of a given selected overlay effect with the specified modification being part of the information utilized to control access to the protected resource; and
wherein user selection of a number of overlay effects and one or more associated modifications of respective ones of the selected overlay effects is required to be sufficient to satisfy a specified minimum entropy measure.

18. An apparatus comprising:
at least one processing device comprising a processor coupled to a memory;
said at least one processing device being configured to implement an overlay effects selection interface;
wherein an image is obtained and presented in the overlay effects selection interface with a plurality of user-selectable overlay effects;
wherein user input is received identifying at least one overlay effect selected from the plurality of user-selectable overlay effects;
wherein a modified version of the image is presented incorporating the selected at least one overlay effect;
wherein information characterizing the image and the selected at least one overlay effect is utilized to control access to a protected resource;
wherein additional user input is received specifying a modification of at least one of a size, an orientation and a color of a given selected overlay effect with the specified modification being part of the information utilized to control access to the protected resource; and
wherein user selection of a number of overlay effects and one or more associated modifications of respective ones of the selected overlay effects is required to be sufficient to satisfy a specified minimum entropy measure.

19. The apparatus of claim 18 wherein the information characterizing the image and the selected at least one overlay effect is obtained as part of a graphical password enrollment process and stored as at least a portion of a graphical password for controlling access to the protected resource.

20. The apparatus of claim 18 wherein the information characterizing the image and the selected at least one overlay effect is obtained as part of a graphical password verification process and compared to at least a portion of a previously-stored graphical password for controlling access to the protected resource.

21. The method of claim 1 wherein one or more random overlay effects are applied to the modified version of the image upon presentation of the modified version of the image in conjunction with a graphical password verification process with the one or more random overlay effects being subject to removal as part of the graphical password verification process.

22. The non-transitory processor-readable storage medium of claim 17 wherein one or more random overlay effects are applied to the modified version of the image upon presentation of the modified version of the image in conjunction with a graphical password verification process with the one or more random overlay effects being subject to removal as part of the graphical password verification process.

* * * * *